United States Patent
Yamato et al.

(10) Patent No.: US 12,520,678 B2
(45) Date of Patent: Jan. 6, 2026

(54) DISPLAY DEVICE

(71) Applicant: SHARP KABUSHIKI KAISHA, Sakai (JP)

(72) Inventors: Asahi Yamato, Sakai (JP); Ryoh Araki, Sakai (JP); Tsuyoshi Kawaguchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 1241 days.

(21) Appl. No.: 16/964,167

(22) PCT Filed: Jan. 30, 2018

(86) PCT No.: PCT/JP2018/002998
§ 371 (c)(1),
(2) Date: Jul. 22, 2020

(87) PCT Pub. No.: WO2019/150438
PCT Pub. Date: Aug. 8, 2019

(65) Prior Publication Data
US 2021/0036092 A1    Feb. 4, 2021

(51) Int. Cl.
*H10K 59/131* (2023.01)
*G02F 1/1345* (2006.01)
(Continued)

(52) U.S. Cl.
CPC ....... *H10K 59/131* (2023.02); *G02F 1/13452* (2013.01); *G06F 1/1637* (2013.01);
(Continued)

(58) Field of Classification Search
CPC ....... H10K 59/12; H10K 59/131–1315; H10K 2102/301–311; H10K 77/10–111;
(Continued)

(56) References Cited

U.S. PATENT DOCUMENTS 10,706,753 B2 * 7/2020 Lee ............... G02F 1/136213
2002/0176044 A1  11/2002 Lim
(Continued)

FOREIGN PATENT DOCUMENTS

JP    2009-020228 A    1/2009
JP    2009-271313 A    11/2009
(Continued)

*Primary Examiner* — Sue A Purvis
*Assistant Examiner* — Aneta B Cieslewicz
(74) *Attorney, Agent, or Firm* — ScienBiziP, P.C.

(57) ABSTRACT

A display device includes: a display region; a frame region comprising a folding portion, the frame region being disposed around the display region; an outer terminal comprising a first outer terminal and a second outer terminal in the frame region, the first and second outer terminals being disposed sequentially on an outside in such a manner that the first outer terminal is closer to the display region than the second outer terminal is, the outside being more remote from the display region than the folding portion is; a first routing wire crossing the folding portion to electrically connect together the first outer terminal and an inner wire that is disposed in the display region; at least one inner terminal disposed inside the folding portion in the frame region; and a second routing wire that is flexible, the second routing wire electrically connecting at least the second outer terminal out of the first and second outer terminals to the at least one inner terminal without passing through the folding portion.

12 Claims, 5 Drawing Sheets

(51) Int. Cl.
    *G06F 1/16* (2006.01)
    *H05K 1/14* (2006.01)
    *H05K 1/18* (2006.01)
    *H10K 77/10* (2023.01)
    *H10K 102/00* (2023.01)

(52) U.S. Cl.
    CPC ............. *H05K 1/147* (2013.01); *H05K 1/189* (2013.01); *H10K 77/111* (2023.02); *H05K 2201/049* (2013.01); *H05K 2201/052* (2013.01); *H05K 2201/053* (2013.01); *H05K 2201/058* (2013.01); *H05K 2201/10128* (2013.01); *H05K 2201/10681* (2013.01); *H10K 2102/311* (2023.02)

(58) Field of Classification Search
    CPC ............. H01L 27/3276; H01L 51/0097; G02F 1/13452; G06F 1/1633; G06F 1/1637; H05K 2201/053; H05K 2201/10681; H05K 2201/049; H05K 2201/052; H05K 2201/10128; H05K 2201/10136; H05K 1/147; H05K 1/189; H05K 2201/05–058; H05K 1/14–148; G09G 1380/02
    See application file for complete search history.

(56) References Cited

U.S. PATENT DOCUMENTS

| | | |
|---|---|---|
| 2014/0254111 A1 | 9/2014 | Yamazaki et al. |
| 2016/0012774 A1 | 1/2016 | OHara et al. |
| 2016/0268542 A1 | 9/2016 | Suzuki |
| 2017/0371195 A1 | 12/2017 | Tomioka et al. |
| 2018/0069067 A1* | 3/2018 | Oh ........................ H10K 59/131 |
| 2018/0158894 A1* | 6/2018 | Park ....................... H10K 71/70 |
| 2019/0013373 A1* | 1/2019 | Lee ....................... H10K 59/131 |
| 2019/0014664 A1* | 1/2019 | Ahn ...................... H10K 59/131 |

FOREIGN PATENT DOCUMENTS

| | | |
|---|---|---|
| JP | 2014-197181 A | 10/2014 |
| JP | 2016-170266 A | 9/2016 |
| JP | 2017-227827 A | 12/2017 |
| WO | 2014/162792 A1 | 10/2014 |

\* cited by examiner

41: DISPLAY REGION

FIG.3

42: FRAME REGION

DISPLAY DEVICE

TECHNICAL FIELD

The disclosure relates to a display device that has a folding portion in a frame region for the purpose of frame narrowing.

BACKGROUND ART

Figure 7:
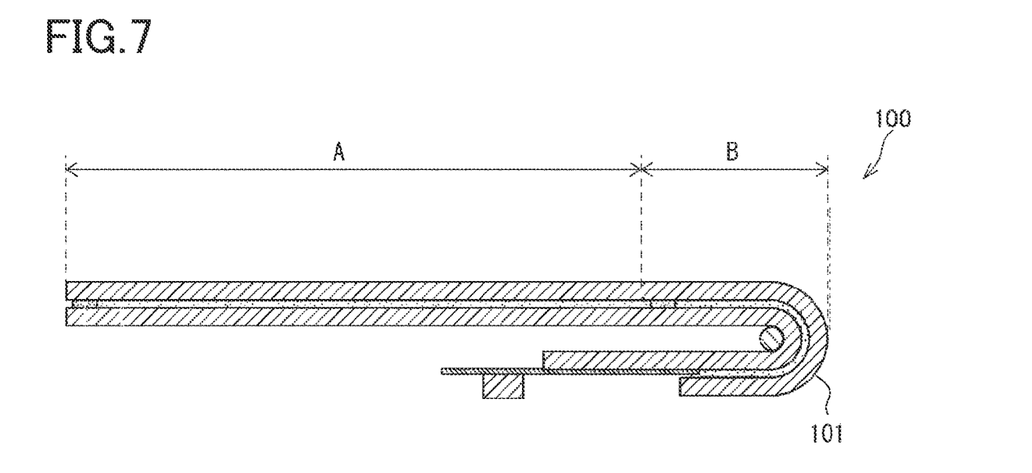
FIG. 7 is a cross-sectional view of the configuration of a known display device.

A display device 100 disclosed in Patent Literature 1 for instance has a display region A and a peripheral region B, as illustrated in FIG. 7. Disposed in the peripheral region B is a folding portion 101 for the purpose of frame narrowing. The peripheral region B is thus folded at the folding portion 101.

CITATION LIST

Patent Literature

Patent Literature 1: Japanese Patent Application Laid-Open No. 2016-170266 (published on Sep. 23, 2016)

SUMMARY

Technical Problem

Unfortunately in such a known display device, not a simple straight wire, but a wire having cutouts needs to be provided at the folding portion in order to avoid a break at the folding portion, as commonly known. The wire consequently has high resistance.

To solve this known problem, it is an object of one aspect of the disclosure to provide a display device that can lower wire resistance in frame narrowing.

Solution to Problem

To solve the above problem, one aspect of the disclosure provides a display device. The display device includes a display region, a frame region having a folding portion and disposed around the display region, and an outer terminal having a first outer terminal and a second outer terminal in the frame region. Here, the first and second outer terminals are disposed sequentially on an outside in such a manner that the first outer terminal is closer to the display region than the second outer terminal is. In addition, the outside is more remote from the display region than the folding portion is. The display device also includes a first routing wire crossing the folding portion to electrically connect together the first outer terminal and an inner wire that is disposed in the display region. The display device also includes at least one inner terminal disposed inside the folding portion in the frame region, and a second routing wire that is flexible. Here, the second routing wire electrically connects at least the second outer terminal out of the first and second outer terminals to the at least one inner terminal without passing through the folding portion.

Advantageous Effect of Disclosure

The aspect of the disclosure provide a display device that can lower wire resistance in frame narrowing.

BRIEF DESCRIPTION OF DRAWINGS

FIG. 4(a) to FIG. 4(l) are each a plan view of the shape of a first routing wire of the organic EL display device.

DESCRIPTION OF EMBODIMENTS

First Embodiment

Figure 1:
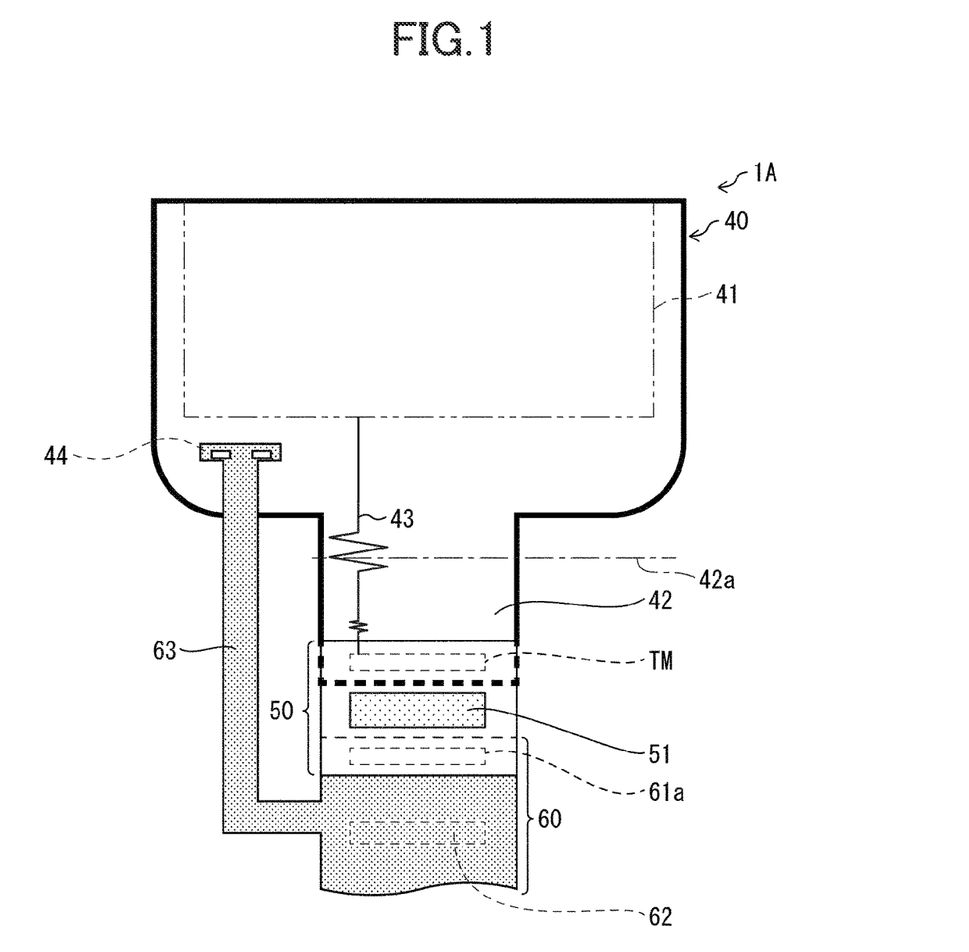
FIG. 1 is a schematic plan view of the entire configuration of an organic EL display device, which is a display device, according to a first embodiment of the disclosure.
Figure 2:
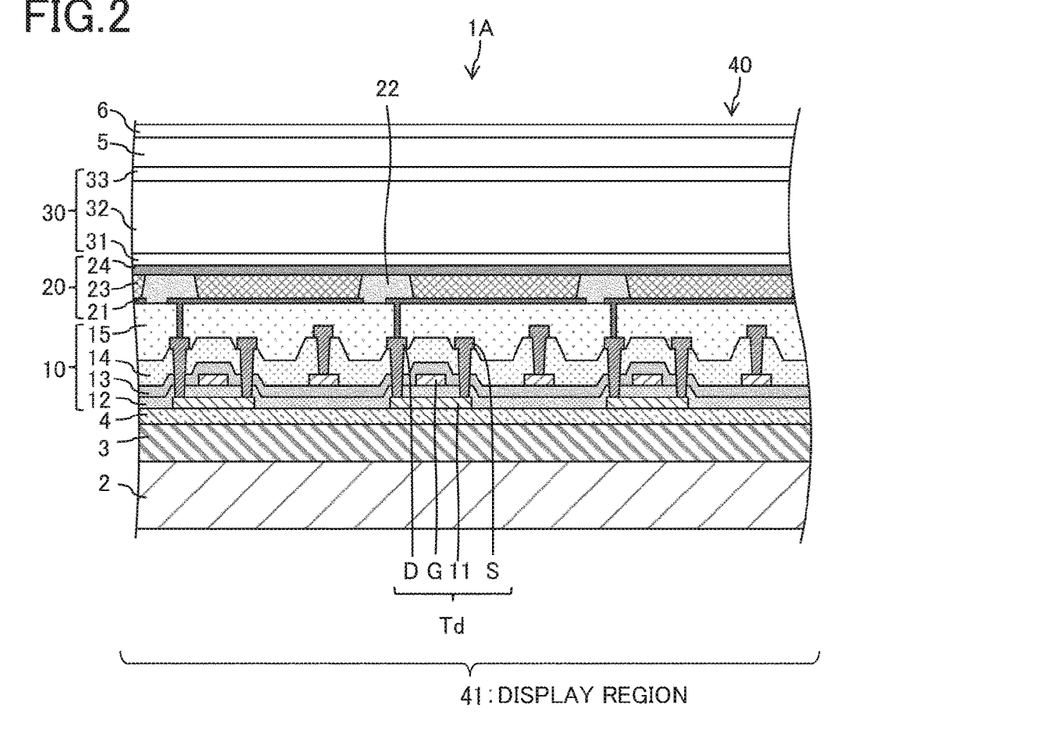
FIG. 2 is a cross-sectional view of the configuration of the organic EL display device, which is a display device.
Figure 3:
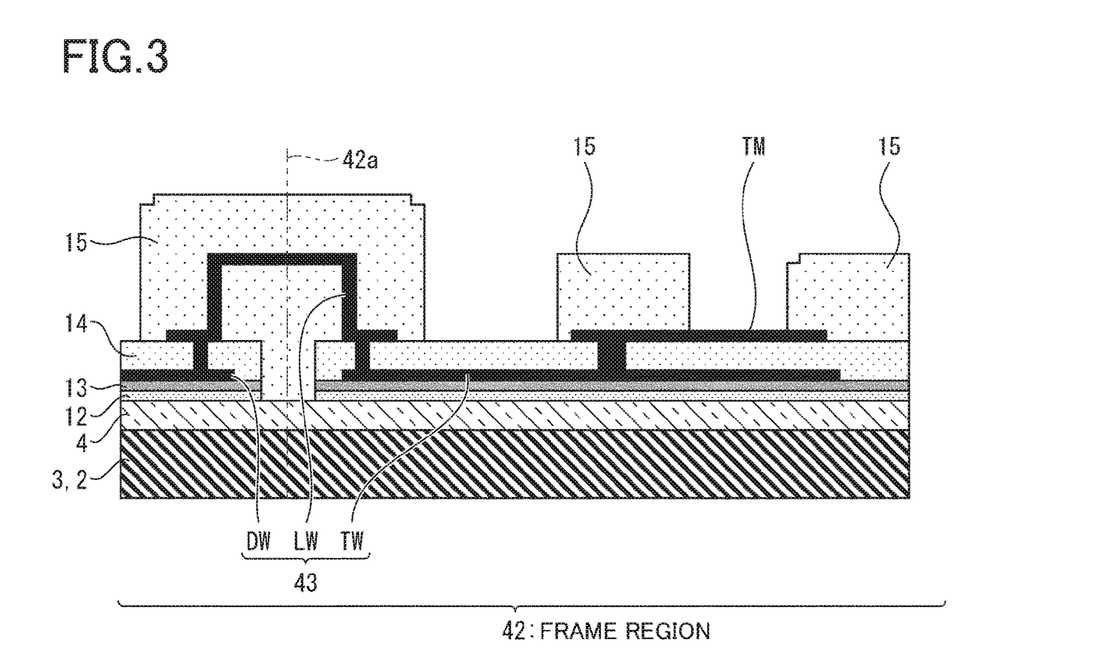
FIG. 3 is a cross-sectional view of the configuration of the end of a frame region of the organic EL display device.

With reference to FIGS. 1 to 3, one embodiment of the present invention will be described.

With reference to FIG. 1, the following describes the entire configuration of an organic EL display device 1A for instance, which is a display device, according to a first embodiment. FIG. 1 is a schematic plan view of the entire configuration of the organic EL display device 1A according to this embodiment.

The organic EL display device 1A (i.e., display device) according to this embodiment is a top-emission organic EL display device, in which light is emitted upward. As illustrated in FIG. 1, the organic EL display device 1A includes a display panel 40, and an electronic circuit board 50 connected to the display panel 40 and composed of a flexible board. It is noted that the organic EL display device 1A does not necessarily have to be a top-emission device, and it may be a bottom-emission device.

The display panel 40 has a display region 41 and a frame region 42 disposed around the display region 41. The frame region 42 for instance partly protrudes from one of the sides of the rectangular display region 41. In this embodiment, the protruded frame region 42 is partly folded back to the backside of the display region 41 at a folding portion 42a for the purpose of frame narrowing.

With reference to FIGS. 2 and 3, the cross-sectional structure of the display panel 40 of the organic EL display device 1A will be described. FIG. 2 is a cross-sectional view of the configuration of the organic EL display device 1A. FIG. 3 is a cross-sectional view of the configuration of the end of the frame region 42 of the organic EL display device 1A.

As illustrated in FIG. 2, the display region 41 of the display panel 40 includes, sequentially from the bottom, a base 2, a resin layer 3, a barrier layer 4 (i.e., an undercoat layer), a thin-film-transistor (TFT) layer 10, a light-emitting-element layer 20, a seal layer 30, an adhesive layer 5, and a function film 6.

The base 2 is made of, but not limited to, polyethylene terephthalate (PET). The resin layer 3 is made of, but not limited to, polyimide, epoxy, or polyamide.

The barrier layer 4 avoids moisture and impurities from reaching the TFT layer 10 and the light-emitting-element layer 20 when the display device is used. The barrier layer 4 can be composed of a silicon oxide film, a silicon nitride film, or a silicon oxide nitride film, all of which are formed through chemical vapor deposition (CVD), or the barrier layer 4 can be composed of a lamination of these films.

The TFT layer 10 includes a semiconductor film 11, an inorganic insulating film 12 over the semiconductor film 11, a gate electrode G over the inorganic insulating film 12, an inorganic insulating film 13 over the gate electrode G, a capacitance wire (not shown) over the inorganic insulating film 13, an inorganic insulating film 14 over the capacitance wire, a source electrode S over the inorganic insulating film 14, a drain electrode D over the inorganic insulating film 14, and a flattening film 15 over the source electrode S and the drain electrode D.

The semiconductor film 11, the inorganic insulating film 12 (i.e., a gate insulating film), and the gate electrode G constitute thin-film transistors Td serving as light-emission control transistors. The source electrode S is connected to the source region of the semiconductor film 11, and the drain electrode D is connected to the drain region of the semiconductor film 11.

The semiconductor film 11 is made of, but not limited to, low-temperature polysilicon (LTPS) or an oxide semiconductor. It is noted that each TFT with the semiconductor film 11 serving as a channel, although having a top-gate structure in FIG. 2, may have a bottom-gate structure. For instance, a TFT whose channel is made of an oxide semiconductor has a bottom-gate structure.

The inorganic insulating films 12, 13, and 14 each can be composed of a silicon oxide (SiOx) film or a silicon nitride (SiNx) film, both of which are formed through CVD; alternatively, the inorganic insulating films 12, 13, and 14 each can be composed of a lamination of these films. The flattening film 15 functions as an interlayer insulating film and can be made of a photosensitive organic material that can be applied, such as polyimide or acrylic.

The gate electrode G, the source electrode S, the drain electrode D, and terminals are each composed of a monolayer film of metals including at least one of aluminum (Al), tungsten (W), molybdenum (Mo), tantalum (Ta), chromium (Cr), titanium (Ti), and copper (Cu), for instance; alternatively, the gate electrode G, the source electrode S, the drain electrode D, and the terminals are each composed of a laminated film of these materials.

The light-emitting-element layer 20 in this embodiment is an organic light-emitting-diode layer for instance. The light-emitting-element layer 20 includes an anode electrode 21 disposed over the flattening film 15, a pixel bank 22 defining sub-pixels in the display region 41 overlapping the light-emitting-element layer 20, a light-emitting layer 23 disposed over the anode electrode 21, and a cathode electrode 24 disposed over the light-emitting layer 23. For instance, an organic light-emitting diode (OLED) is provided to include the anode electrode 21, the light-emitting layer 23, and the cathode electrode 24.

The pixel bank 22 covers the edge of the anode electrode 21. The light-emitting layer 23 is placed in a light-emitting region, which is a region surrounded by the pixel bank 22, through vapor deposition or an inkjet method. When the light-emitting-element layer 20 is an organic light-emitting diode (OLED) layer, a hole injection layer, a hole transport layer, the light-emitting layer 23, an electron transport layer, and an electron injection layer, for instance, are laminated on the bottom of the pixel bank 22, that is, on a portion where the anode electrode 21 is exposed. Herein, these layers except the light-emitting layer 23 can be composed of a common layer.

The anode (or positive) electrode 21 is composed of, but not limited to, a lamination of an indium tin oxide (ITO) and an alloy containing silver (Ag), and the anode electrode 21 is photoreflective. The cathode electrode 24 can be composed of a translucent conductor, such as an indium tin oxide (ITO) or an indium zinc oxide (IZO).

When the light-emitting-element layer 20 is an OLED layer, holes and electrons are rejoined within the light-emitting layer 23 by a drive current flowing between the anode electrode 21 and the cathode electrode 24, thereby producing excitons. These excitons become a ground state, thus emitting light. The cathode electrode 24 is translucent, and the anode electrode 21 is photoreflective; hence, the light from the light-emitting layer 23 moves upward to be emitted from the top.

The light-emitting-element layer 20 may form inorganic light-emitting diodes or quantum-dot light-emitting diodes, other than OLED elements.

The seal layer 30 is over the light-emitting-element layer 20. The seal layer 30 is translucent. The seal layer 30 includes an inorganic seal film 31 covering the cathode electrode 24 of the light-emitting-element layer 20, an organic seal film 32 disposed over the inorganic seal film 31, and an inorganic seal film 33 covering the organic seal film 32.

The inorganic seal films 31 and 33 each can be composed of a silicon oxide film, a silicon nitride film, or a silicon oxide nitride film, all of which are formed through CVD using a mask; alternatively, the inorganic seal films 31 and 33 each can be composed of a lamination of these films.

The organic seal film 32 is a translucent organic film thicker than the inorganic seal films 31 and 33 and can be composed of a photosensitive organic material that can be applied, such as polyimide or acrylic. For instance, the organic seal film 32 is provided by inkjet application of an ink containing such an organic material, followed by undergoing curing by UV irradiation.

The seal layer 30 accordingly covers the light-emitting-element layer 20 and avoids foreign substances, such as water and oxygen, from penetrating the light-emitting-element layer 20.

The function film 6 has, for instance, an optical-compensation function, a touch-sensor function, and a protection function. The function film 6 is joined using the adhesive layer 5.

The frame region 42 of the display panel 40 has an end at which a first routing wire 43 extending from an inner wire in the display region 41 is disposed, as illustrated in FIG. 3. The first routing wire 43 includes a lead wire DW, a relay wire LW, and a terminal wire TW.

The lead wire DW is electrically connected to various inner wires in the TFT layer 10 illustrated in FIG. 2. To be specific, the lead wire DW is connected to an inner wire in the display region 41, which is for instance a source wire (i.e., a data wire) disposed in the display region 41 and connected to the source electrode S. Here, when a gate wire (not shown) connected to the gate electrode G is connected to an IC chip 51 (described later on) via a first outer terminal TM, this gate wire is included in the inner wire in the display region 41.

The relay wire LW is formed in the same process step as the source electrode S for instance. The relay wire LW is thus formed on the inorganic insulating film 14 by using the same material as the source electrode S. To be specific, the relay wire LW and the source electrode S are composed of, but not limited to, two titanium films and one aluminum film sandwiched by these two films. The relay wire LW is covered with the flattening film 15. In this embodiment, the folding portion 42a is disposed in a location where the relay wire LW is disposed.

The terminal wire TW further extends from the relay wire LW to the distal end of the frame region 42, and the first outer terminal TM is connected to this distal end. The flattening film 15 is disposed over part of the first outer terminal TM. The rest of the first outer terminal TM is thus exposed.

In the frame region 42 is disposed an outer terminal having the first outer terminal TM and a second outer terminal (described later on). The first outer terminal TM and the second outer terminal are disposed sequentially on an outside in such a manner that the first outer terminal TM is closer to the display region 41 than the second outer terminal is. Here, the outside is more remote from the display region 41 than the folding portion 42*a* is. The outer terminal is connected to the first routing wire 43 and a second routing wire 63 (described later on).

In this embodiment, the electronic circuit board 50 and a flexible printed circuit 60 (hereinafter abbreviated as an FPC 60) are connected to the end of the frame region 42, as illustrated in FIG. 1. The FPC 60 is disposed at the outermost end of the frame region 42; in addition, the electronic circuit board 50 is disposed over part of an end of the FPC 60 adjacent to the folding portion 42*a*. The electronic circuit board 50 and the FPC 60 are connected together at a joint 61*a*.

The IC chip 51 for instance is mounted on the electronic circuit board 50. The IC chip 51 has a terminal connected to the first outer terminal TM, which is part of the outer terminal, via an ACF or anisotropic conductive film (not shown). The electronic circuit board 50 thus has components mounted through "chip-on-film" (COF).

The second outer terminal, which is herein a connector 62, is disposed on the FPC 60. The connector 62 is connected to the second routing wire 63. The second routing wire 63 will be detailed later on.

The display panel 40 of the organic EL display device 1A according to this embodiment is flexible. In addition, the folding portion 42*a* is disposed in the frame region 42, which is the peripheral region of the display panel 40, and the frame region 42 of the display panel 40 is folded at the folding portion 42*a* for the purpose of frame narrowing. At the folding portion 42*a*, the inorganic insulating films 13 and 14 are removed, and the flattening film 15, an organic film, is filled to facilitate folding, as illustrated in FIG. 3. Furthermore, the electronic circuit board 50 and the FPC 60 are connected together outside the folding portion 42*a* in the display panel 40, as described above.

The foregoing has described that the electronic circuit board 50 is provided with the IC chip 51 (i.e., an integrated-circuit element), which drives the display region 41 of the display panel 40. The electronic circuit board 50 is also provided with other elements, such as a semiconductor element (not shown) for power-source supply.

Consequently, the first routing wire 43 between the display region 41 of the display panel 40 and the IC chip 51 crosses the folding portion 42*a* of the display panel 40. This is because that since the first routing wire 43 is connected to a data wire having many output terminals, frame narrowing cannot be achieved without folding.

Figure 4:
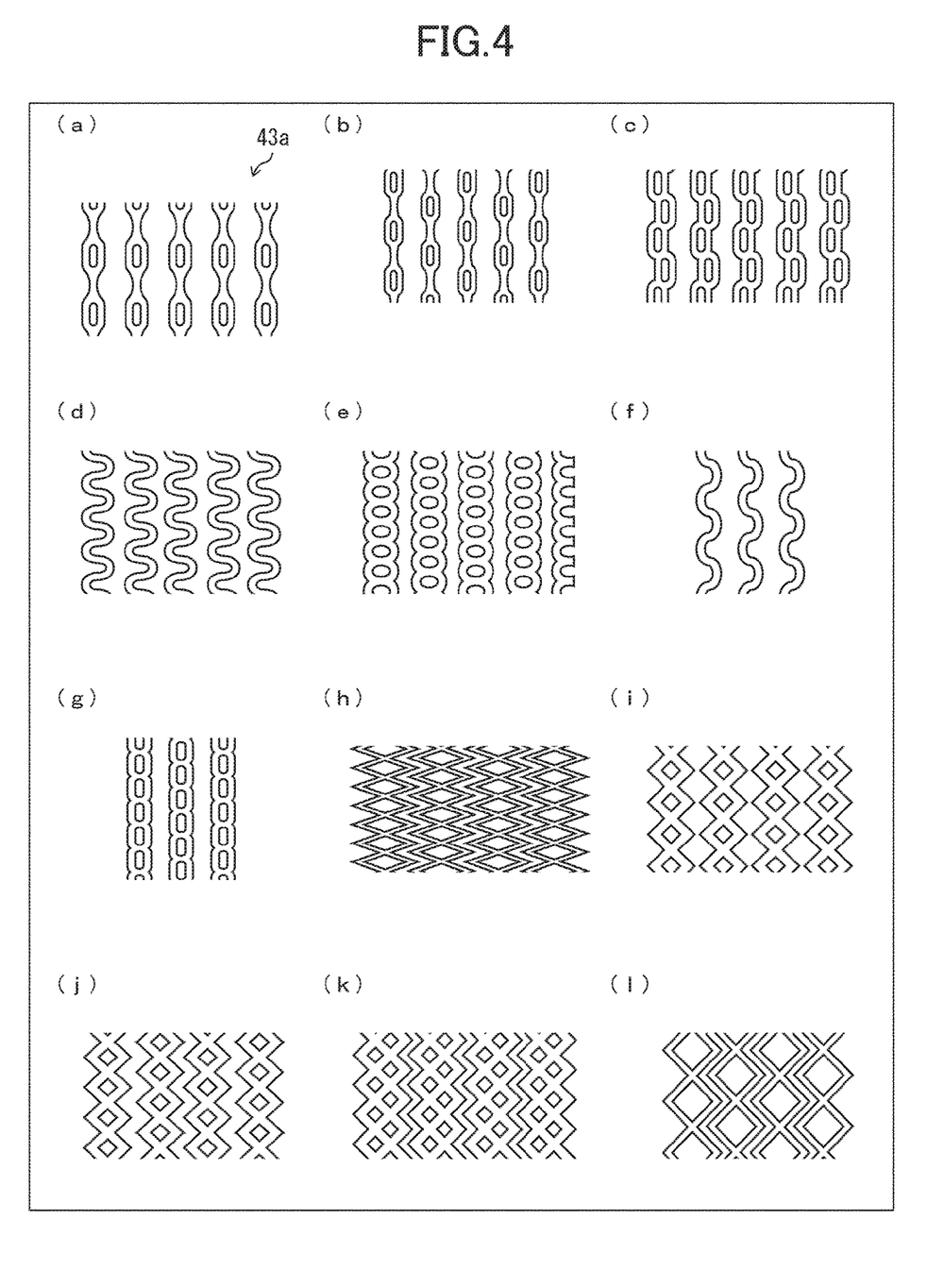

The following describes the shape of the first routing wire 43 with reference to FIG. 4(*a*) to FIG. 4(*l*). FIG. 4(*a*) to FIG. 4(*l*) are plan views of the shape of the first routing wire 43 of the organic EL display device 1A.

The organic EL display device 1A according to this embodiment is configured such that the first routing wire 43 avoids a break at the folding portion 42*a* and thus has many limitations on shape. Hence, provided is a wide, meshed, or cutout-shaped wire 43*a*, for instance, rather than a simple straight wire, as illustrated in FIG. 4(*a*) to FIG. 4(*l*). Such a shape unfortunately causes the first routing wire 43 to have high resistance. That is, the first routing wire 43 is a wire having high impedance. In addition, the electronic circuit board 50, on which components are mounted through chip-on-film (COF), tends to exhibit high resistance at a crimp terminal.

In contrast, a power-source supply wire or other types of wire that requires a small number of terminals, which takes up a small connection region, does not prevent frame narrowing without passing through the folding portion 42*a*. In addition, a power-source supply wire having large resistance consumes power particularly.

The organic EL display device 1A according to this embodiment is accordingly configured such that the FPC 60 and an inner terminal 44 are connected together by the second routing wire 63 directly disposed, as illustrated in FIG. 1. Here, the inner terminal 44 is disposed inside the folding portion 42*a* in the frame region 42. That is, the second routing wire 63 is connected from the semiconductor element for power-source supply (not shown) mounted on the FPC 60, through the connector 62 or second outer terminal, to the inner terminal 44 without passing through the folding portion 42*a* in the frame region 42. The second routing wire 63 is near the first routing wire 43 and has impedance lower than the impedance of the first routing wire 43. The second routing wire 63 is composed using part of the FPC 60 and is thus flexible. It is noted that the second routing wire 63 does not necessarily have to be composed of a flexible printed board, and it may be composed of a flexible cover wire for instance. In folding the frame region 42 at the folding portion 42*a*, such a second routing wire 63 can be consequently folded flexibly while maintaining its insulating capability.

The second routing wire 63 is connected to the IC chip 51 on the electronic circuit board 50, for instance, when it is a power-source voltage wire (i.e., a power-source supply wire).

Such a configuration can avoid a break in the organic EL display device 1A, having the folding portion 42*a* in the frame region 42 of the display panel 40 for the purpose of frame narrowing, and this configuration can lower total wire resistance. By extension, this configuration provides such an organic EL display device 1A that can reduce power consumption and avoid degradation in display quality. That is, high resistance decreases voltage greatly and fluctuates the amount of light emissions greatly. This degrades display quality.

In this embodiment, the first routing wire 43 and the second routing wire 63 (e.g., a power-source supply wire) are routed through mutually different paths. Such a configuration can avoid noise entrance into the first routing wire 43.

The organic EL display device 1A according to this embodiment is configured such that the IC chip 51 (i.e., an integrated-circuit element) is disposed on the electronic circuit board 50 through COF. When the IC chip 51 is on the electronic circuit board 50, this configuration provides such an organic EL display device 1A that can lower total wire resistance, and by extension, can reduce power consumption and avoid degradation in display quality, in the organic EL display device 1A, where the folding portion 42*a* is in the frame region 42 of the display panel 40 for the purpose of frame narrowing.

This embodiment has described that the second routing wire 63 is used for a power-source supply wire. In one embodiment of the disclosure, the second routing wire 63 is not necessarily used as a power-source supply wire and can be used as other types of wire having a small number of terminals. For instance, the second routing wire 63 can be used as at least one of the following wires: a power-source supply wire that transmits the aforementioned high or low power-source voltage, a wire that transmits a clock signal, a wire that transmits a start pulse signal, and a wire that transmits a switch signal for time-division drive. Alternatively, the second routing wire 63 can be shared with an inspection terminal. For instance, the resistance of the wire that transmits the clock signal is desirably lowered, because a large current flows through this wire. The second routing wire 63 used as wires other than the power-source supply wire is for instance connected from the FPC 60 to an external circuit (not shown) without being connected to the IC chip 51.

In this way, the organic EL display device 1A according to this embodiment includes the inner terminal 44 inside the folding portion 42a in the frame region 42. The organic EL display device 1A also includes the second routing wire 63 that is flexible. The second routing wire 63 electrically connects at least the connector 62 out of the first outer terminal TM and the connector 62 (i.e., the second outer terminal) to the inner terminal 44 without passing through the folding portion 42a. That is, the second routing wire 63 in this embodiment connects together at least the connector 62 and the inner terminal 44, which is disposed inside the folding portion 42a in the frame region 42, directly without passing through the folding portion 42a.

This configuration provides such an organic EL display device that can lower wire resistance in frame narrowing.

The organic EL display device 1A according to this embodiment is configured such that the display region 41 is provided with the thin-film transistors Td, the light-emitting-element layer 20, and the flattening film 15 that is disposed over the thin-film transistors Td and under the light-emitting-element layer 20. The organic EL display device 1A is also configured such that the first routing wire 43 is disposed over the gate electrodes G of the thin-film transistors Td and under the flattening film 15 or is disposed in the same layer as the gate electrodes G. The first routing wire 43 can be consequently formed in the same process step as the inner wire in the display region 41.

The organic EL display device 1A according to this embodiment is configured such that the second routing wire 63 is disposed near the folding portion 42a. Accordingly, the first routing wire 43 is routed through the folding portion 42a; thus, this enables the second routing wire 63 and the first routing wire 43 to be collectively disposed close to each other.

The organic EL display device 1A according to this embodiment is configured such that the second routing wire 63 is composed using a flexible printed board. This configuration enables the second routing wire 63 to be flexible, thereby facilitating folding.

The organic EL display device 1A according to this embodiment is configured such that the electronic circuit board 50, on which components are mounted through chip-on-film (COF), and the FPC 60 are disposed outside the folding portion 42a in the frame region 42. The first outer terminal TM of the first routing wire 43 is connected to the IC chip 51 (i.e., an integrated-circuit element), which is mounted on the electronic circuit board 50, and the FPC 60 has the connector 62 (i.e., the second outer terminal), which is part of the outer terminal connected to the second routing wire 63.

This configuration enables the first routing wire 43 and the second routing wire 63 to be installed separately and suitably in accordance with their respective objects when the electronic circuit board 50, on which components are mounted through COF, and the FPC 60 are disposed outside the folding portion 42a in the frame region 42.

The organic EL display device 1A according to this embodiment can be configured such that the second routing wire 63 supplies a high power-source voltage or a low power-source voltage.

The high power-source voltage or the low power-source voltage is preferably supplied at low impedance. As a result, supplying the high power-source voltage or the low power-source voltage through the second routing wire 63 can avoid a total wire break and lower total wire resistance. By extension, this configuration provides such an organic EL display device 1A that can reduce power consumption and avoid degradation in display quality.

The organic EL display device 1A according to this embodiment can be configured such that the second routing wire 63 transmits at least one of a clock signal, a start pulse signal, and a switch signal for time-division drive.

Each of the number of signal lines for the clock signal, the number of signal lines for the start pulse signal, and the number of signal lines for the switch signal for time-division drive is smaller than the number of signal lines for the thin-film transistors Td included in the individual pixels in the display region 41, and these signal lines can be routed through a path different from the path of the second routing wire 63. Accordingly, transmitting at least one of the clock signal, the start pulse signal, and the switch signal for time-division drive through the second routing wire 63 can lower total wire resistance. By extension, this configuration provides such an organic EL display device 1A that can reduce power consumption.

The organic EL display device 1A according to this embodiment is configured such that the second routing wire 63 has lower resistance than the first routing wire does. This configuration can avoid a total wire break and lower total wire resistance. By extension, this configuration provides such an organic EL display device 1A that can reduce power consumption. Frame narrowing and resistance lowering can be both achieved consequently.

Second Embodiment

Figure 5:
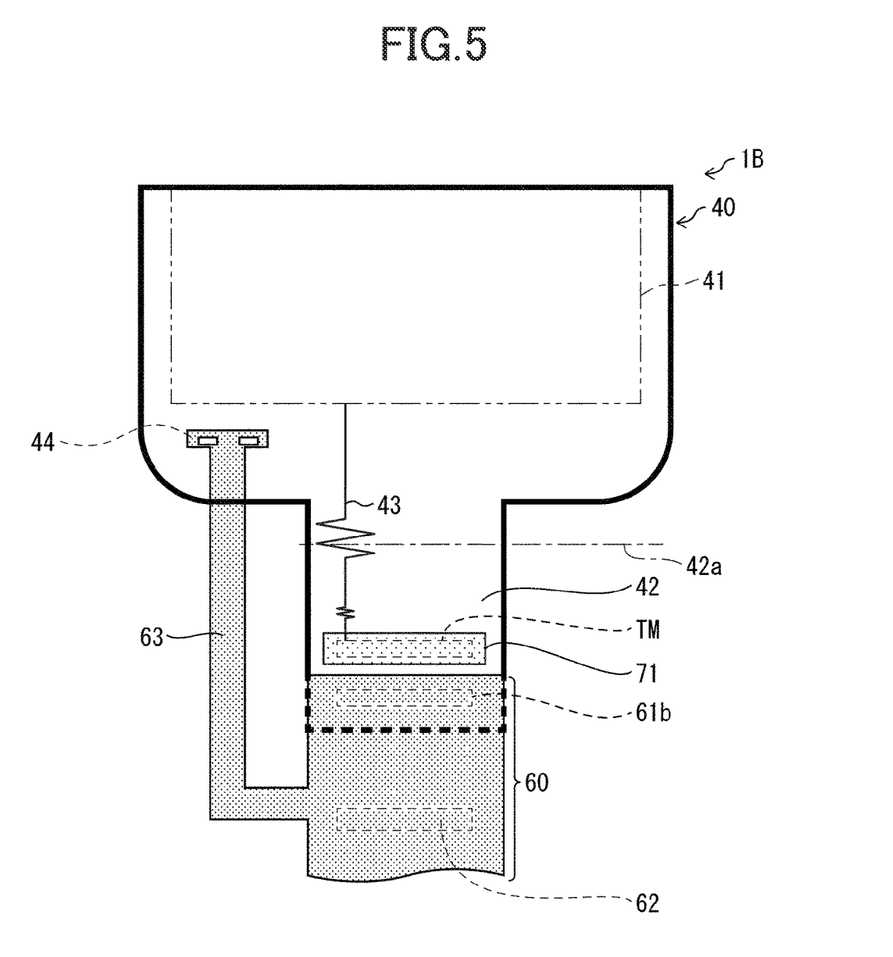
FIG. 5 is a schematic plan view of the entire configuration of an organic EL display device, which is a display device, according to a second embodiment of the disclosure.

With reference to FIG. 5, another embodiment of the disclosure will be described. Configurations other than the configuration described in a second embodiment are the same as those in the first embodiment. For convenience in description, components whose functions are the same as those of the components shown in the drawings in the first embodiment will be denoted by the same signs and will not be elaborated upon here.

The first embodiment has described that the organic EL display device 1A includes the IC chip 51 (i.e., an integrated-circuit element) disposed on the electronic circuit board 50. In contrast, the second embodiment describes a different, organic EL display device 1B that includes an IC chip 71 (i.e., an integrated-circuit element) disposed outside the folding portion 42a in the frame region 42 of the display panel 40.

With reference to FIG. 5, the following describes the configuration of the organic EL display device 1B, which is a display device, according to this embodiment. FIG. 5 is a schematic plan view of the configuration of the organic EL display device 1B according to this embodiment.

As illustrated in FIG. 5, the organic EL display device 1B according to this embodiment is configured such that the IC chip 71 (i.e., an integrated-circuit element) is disposed outside the folding portion 42a in the frame region 42 of the display panel 40. To be specific, the IC chip 71 is mounted directly on the first outer terminal TM. The IC chip 71 is thus provided through "chip-on-panel" (COP).

In this embodiment, the FPC 60, having the connector 62, is connected at a joint 61b outside the folding portion 42a in the frame region 42, and the second routing wire 63 is electrically connected to the connector 62.

When the IC chip 71 is outside the folding portion 42a in the frame region 42 of the display panel 40, this configuration can lower total wire resistance in the organic EL display device 1B, which has the folding portion 42a in the frame region 42 of the display panel 40 for the purpose of frame narrowing, and by extension, this configuration provides such an organic EL display device 1B that can reduce power consumption.

Third Embodiment

Figure 6:
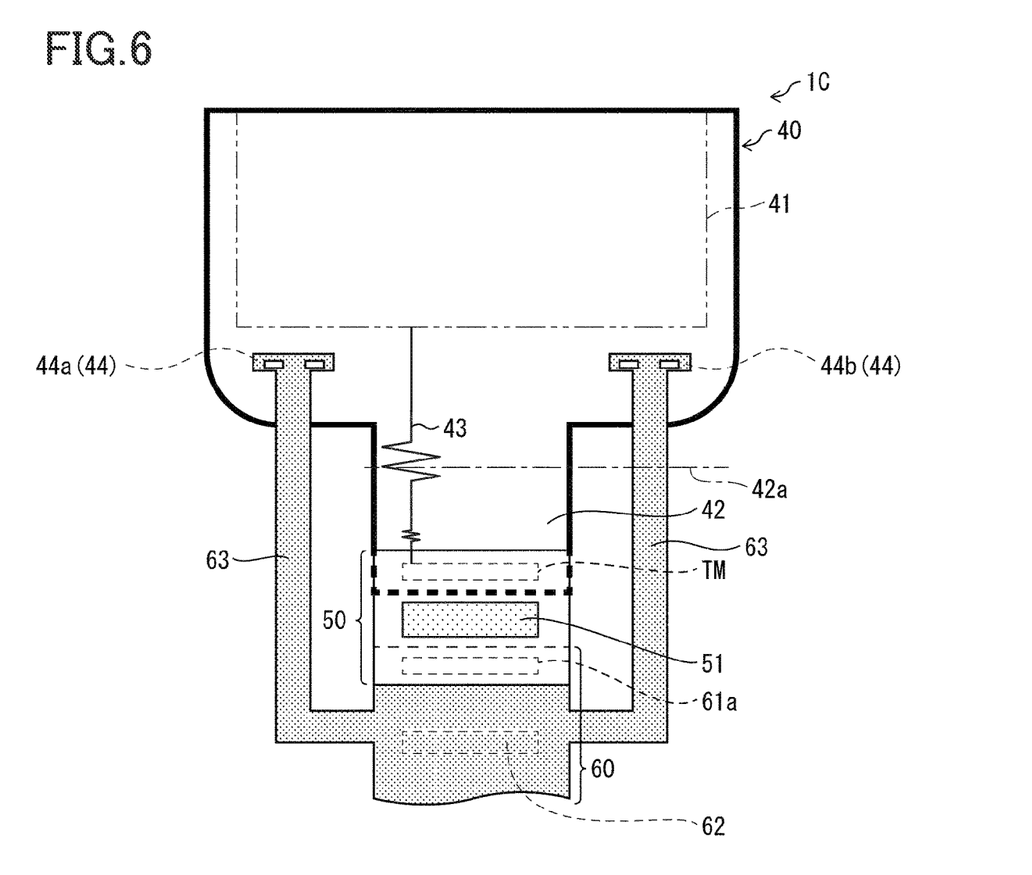
FIG. 6 is a schematic plan view of the entire configuration of an organic EL display device, which is a display device, according to a third embodiment of the disclosure.

With reference to FIG. 6, further another embodiment of the disclosure will be described. Configurations other than the configuration described in a third embodiment are the same as those in the first and second embodiments. For convenience in description, components whose functions are the same as those of the components shown in the drawings in the first and second embodiments will be denoted by the same signs and will not be elaborated upon here.

This embodiment describes a different, organic EL display device 1C (i.e., a display device) that includes multiple inner terminals 44 disposed inside the folding portion 42a in the frame region 42, and multiple second routing wires 63, in addition to the components of the organic EL display device 1A according to the first embodiment.

With reference to FIG. 6, the following describes the configuration of the organic EL display device 1C, which is a display device, according to this embodiment. FIG. 6 is a schematic plan view of the configuration of the organic EL display device 1C according to this embodiment.

As illustrated in FIG. 6, the organic EL display device 1C according to this embodiment includes the multiple inner terminals 44 inside the folding portion 42a in the frame region 42. The organic EL display device 1C also includes the multiple second routing wires 63. In other words, the second routing wires 63 are connected from multiple parts of the FPC 60 to the inner terminals 44. To be specific, two second routing wires 63 extend from both right and left sides of the FPC 60 to two inner terminals 44a and 44b, disposed inside the folding portion 42a in the frame region 42 of the display panel 40, without passing through the folding portion 42a in the frame region 42. One of the second routing wires 63 is electrically connected from the connector 62 (i.e., the second outer terminal) of the FPC 60 to the inner terminal 44a, and the other second routing wire 63 is electrically connected from the connector 62 of the FPC 60 to the inner terminal 44b. The second routing wires 63 are flexible and have lower impedance than the first routing wire 43 does.

The above configuration, where there are two inner terminals 44a and 44b and two second routing wires 63 connected to the respective inner terminals 44a and 44b, can lower total wire resistance easily, and by extension, provides such an organic EL display device 1C that can reduce power consumption easily. When the inner terminals 44a and 44b are provided, this configuration can increase flexibility in designing the layout of wires connected to the second routing wires 63 for instance. This can facilitate wiring advantageously.

The third embodiment has described that multiple second routing wires 63 are provided in the organic EL display device 1A according to the first embodiment. In one embodiment of the disclosure, multiple inner terminals 44 and multiple second routing wires 63 can be provided in the organic EL display device 1B according to the second embodiment as well. That is, multiple second routing wires 63 can be provided in a display device in which the IC chip 71 is disposed directly in the frame region 42 of the display panel 40.

The first to third embodiments have described, by way of example only, the organic EL display devices 1A to 1C, each of which is a display device. In one embodiment of the disclosure, any device may be used that includes display elements. Such display devices include a display element whose brightness and transmittance are regulated by current, and a display element whose brightness and transmittance are regulated by voltage. Examples of the current-regulated display element include an electro-luminescence (EL) display device (e.g., an organic EL display device having OLEDs or organic light-emitting diodes, and an inorganic EL display device having inorganic light-emitting diodes), and a quantum-dot-light-emitting-diode (QLED) display device having QLEDs. Moreover, an example of the voltage-regulated display element is a liquid-crystal display element.

SUMMARY

A first aspect of the disclosure provides a display device (i.e., organic EL display devices 1A to 1C). The display device includes a display region 41, a frame region 42 having a folding portion 42a and disposed around the display region 41, and an outer terminal having a first outer terminal TM and a second outer terminal (i.e., a connector 62) in the frame region 42. Here, the first outer terminal TM and the second outer terminal are disposed sequentially on an outside in such a manner that the first outer terminal TM is closer to the display region 41 than the second outer terminal is. Here, the outside is more remote from the display region 41 than the folding portion 42a is. The display device also includes a first routing wire 43 crossing the folding portion 42a to electrically connect together the first outer terminal TM and an inner wire that is disposed in the display region 41. The display device also includes at least one inner terminal 44 disposed inside the folding portion 42a in the frame region 42. The display device also includes a second routing wire 63 that is flexible. Here, the second routing wire 63 electrically connects at least the second outer terminal (i.e., the connector 62) out of the first outer terminal TM and the second outer terminal (i.e., the connector 62) to the at least one inner terminal 44 without passing through the folding portion 42a.

In the display device having the above configuration, the frame region has a folding portion, at which the frame region is folded for the purpose of frame narrowing. In addition, the first routing wire between the inner wire in the display region and the first outer terminal crosses the folding portion in the frame region.

In this type of display device, the first routing wire, which has many limitations on shape and is formed to have a large width or other shapes in order to avoid a break at the folding portion, has high resistance consequently.

A power-source supply wire or other types of wire that requires a small number of terminals, which takes up a small connection area, does not prevent frame narrowing without passing through the folding portion.

In the aspect of the disclosure, the inner terminal is inside the folding portion in the frame region, and the flexible second routing wire electrically connects at least the second outer terminal out of the first and second outer terminals to the inner terminal without passing through the folding portion. That is, the second routing wire is connected directly between at least the second outer terminal and the inner terminal, which is disposed inside the folding portion in the frame region, without passing through the folding portion.

Such a configuration provides a display device that can lower wire resistance in frame narrowing.

The display device (i.e., the organic EL display devices 1A to 1C) in a second aspect of the disclosure can be configured such that the display region 41 is provided with multiple thin-film transistors Td, multiple light-emitting elements (i.e., a light-emitting-element layer 20), and a flattening film 15 disposed over the thin-film transistors Td and under the light-emitting elements (i.e., the light-emitting-element layer 20). The display device can be also configured such that the first routing wire 43 is disposed over gate electrodes G of the thin-film transistors Td and under the flattening film 15 or is disposed in the same layer as the gate electrodes G.

The first routing wire can be consequently formed in the same process step as the inner wire in the display region.

The display device (i.e., the organic EL display devices 1A to 1C) in a third aspect of the disclosure is preferably configured such that the second routing wire 63 is disposed near the folding portion 42a.

This configuration enables the first routing wire to be routed through the folding portion, thereby collectively installing the first and second routing wires close to each other.

The display device (i.e., the organic EL display devices 1A to 1C) in a fourth aspect of the disclosure can be configured such that the second routing wire 63 is composed using a flexible printed board.

This configuration enables the second routing wire to be flexible, thereby facilitating folding.

The display device (i.e., the organic EL display device 1A) in a fifth aspect of the disclosure can be configured such that the frame region 42 is provided with an electronic circuit board 50 and a flexible printed circuit 60 that are disposed outside the folding portion 42a. Here, the electronic circuit board 50 has a component mounted through COF. The display device can be also configured such that the first outer terminal TM is connected to an integrated-circuit element (i.e., an IC chip 51) mounted on the electronic circuit board 50 and such that the second outer terminal (i.e., the connector 62) is disposed on the flexible printed circuit 60.

This configuration enables the first and second routing wires to be installed separately and suitably in accordance with their respective objects when the electronic circuit board, having a component mounted through COF, and the flexible printed circuit are disposed outside the folding portion in the frame region.

The display device (i.e., the organic EL display device 1C) in a sixth aspect of the disclosure can be configured such that the at least one inner terminal 44 includes a plurality of inner terminals.

This configuration enables multiple second routing wires to be installed that correspond to the respective inner terminals. Total wire resistance can be consequently lowered easily, and by extension, an organic EL display device can be provided that can reduce power consumption easily. In addition, the layout of wires connected to the second routing wires can be designed freely to a great degree, thus facilitating routing of the second routing wires.

The display device (i.e., the organic EL display devices 1A to 1C) in a seventh aspect of the disclosure can be configured such that the second routing wire 63 supplies a high power-source voltage or a low power-source voltage.

The high power-source voltage or the low power-source voltage is preferably supplied at low impedance. As a result, supplying the high power-source voltage or the low power-source voltage through the second routing wire can avoid a total wire break and lower total wire resistance. By extension, this configuration provides a display device that can reduce power consumption.

The display device (i.e., the organic EL display devices 1A to 1C) in an eighth aspect of the disclosure can be configured such that the second routing wire 63 transmits a clock signal.

The number of signal lines for transmitting the clock signal is smaller than the number of signal lines connected to the thin-film transistor in each pixel in the display region, and these signal lines can be routed through a path different from the path of the first routing wire. As a result, transmitting the clock signal through the second routing wire can lower total wire resistance. By extension, this configuration provides a display device that can reduce power consumption.

The display device (i.e., the organic EL display devices 1A to 1C) in a ninth aspect of the disclosure can be configured such that the second routing wire 63 transmits a start pulse signal.

The number of signal lines for transmitting the start pulse signal is smaller than the number of signal lines connected to the thin-film transistor in each pixel in the display region, and these signal lines can be routed through a path different from the path of the first routing wire. As a result, transmitting the start pulse signal through the second routing wire can lower total wire resistance. By extension, this configuration provides a display device that can reduce power consumption.

The display device (i.e., the organic EL display devices 1A to 1C) in a tenth aspect of the disclosure can be configured such that the second routing wire 63 transmits a switch signal for time-division drive.

The number of signal lines for transmitting the switch signal for time-division drive is smaller than the number of signal lines connected to the thin-film transistor in each pixel in the display region, and these signal lines can be routed through a path different from the path of the first routing wire. As a result, transmitting the switch signal for time-division drive through the second routing wire can lower total wire resistance. By extension, this configuration provides a display device that can reduce power consumption.

The display device (i.e., the organic EL display devices 1A to 1C) in an eleventh aspect of the disclosure is preferably configured such that the second routing wire 63 has a resistance lower than the resistance of the first routing wire 43.

This configuration can avoid a total wire break and lower total wire resistance. By extension, this configuration provides a display device that can reduce power consumption.

The display device (i.e., the organic EL display devices 1A to 1C) in a twelfth aspect of the disclosure can be configured such that the first routing wire 43 transmits a data signal.

This configuration enables the data signal to be transmitted to the pixels in the display region through the first routing wire.

REFERENCE SIGNS LIST 1A to 1C organic EL display device (display device)
10 TFT layer
15 flattening film
20 light-emitting-element layer (multiple light-emitting elements)
23 light-emitting layer
30 seal layer
40 display panel
41 display region
42 frame region
42a folding portion
43 first routing wire
44 inner terminal
44a, 44b inner terminal
50 electronic circuit board
51 IC chip
60 flexible printed circuit (FPC)
61a joint
61b joint
62 connector (second outer terminal)
63 second routing wire
71 IC chip
DW lead wire (first routing wire)
LW relay wire (first routing wire)
TW terminal wire (first routing wire)
TM first outer terminal (outer terminal, first routing wire)
Td thin-film transistor

The invention claimed is:

1. A display device comprising:
a display region;
a frame region comprising:
  a protruding region; and
  a folding portion in the protruding region, the frame region being disposed around the display region, the protruding region having a width smaller than a width of a portion of the frame region other than the protruding region, and extending outwardly from the display region, the folding portion designating a position at which the protruding region is partially folded to a backside of the display region;
an outer terminal comprising a first outer terminal and a second outer terminal in the frame region, the first and second outer terminals being disposed on an outside portion of the frame region, an inside portion being a part of the frame region located close to the display region with reference to the folding portion, the outside portion being a part of the frame region located opposite the display region with reference to the folding portion;
a first routing wire crossing the folding portion to electrically connect together the first outer terminal and the display region in a plain view of the frame region;
at least one inner terminal disposed on the inside portion of the frame region; and
a second routing wire being flexible and electrically connecting at least the second outer terminal out of the first and second outer terminals to the at least one inner terminal by bypassing the folding portion in the plain view of the frame region, wherein
the frame region further comprises, on the outside portion:
  an electronic circuit board connected to the first routing wire via the first outer terminal;
  a flexible printed circuit provided with the second outer terminal; and
  a joint joining the electronic circuit board and the flexible printed circuit together, and wherein
in a plan view of the frame region, the second outer terminal is disposed so as not to overlap the joint and the electronic circuit board.

2. The display device according to claim 1, wherein the display region comprises:
a plurality of thin-film transistors,
a plurality of light-emitting elements, and
a flattening film disposed over the plurality of thin-film transistors and under the plurality of light-emitting elements, and
the first routing wire is disposed over gate electrodes of the plurality of thin-film transistors and under the flattening film or is disposed in a same layer as the gate electrodes.

3. The display device according to claim 1, wherein the second routing wire is disposed near the folding portion.

4. The display device according to claim 1, wherein the second routing wire is composed using a flexible printed board.

5. The display device according to claim 1, wherein the at least one inner terminal comprises a plurality of inner terminals.

6. The display device according to claim 1, wherein the second routing wire supplies a high power-source voltage or a low power-source voltage.

7. The display device according to claim 1, wherein the second routing wire transmits a clock signal.

8. The display device according to claim 1, wherein the second routing wire transmits a start pulse signal.

9. The display device according to claim 1, wherein the second routing wire transmits a switch signal for time-division drive.

10. The display device according to claim 1, wherein the second routing wire has a resistance lower than a resistance of the first routing wire.

11. The display device according to claim 1, wherein the first routing wire transmits a data signal.

12. The display device according to claim 1, wherein the outer terminal and the at least one inner terminal are disposed in regions located on a same side of the display region such that the folding portion is located between the outer terminal and the at least one inner terminal in the frame region.

* * * * *